US009485180B2

(12) United States Patent
Sarkar et al.

(10) Patent No.: US 9,485,180 B2
(45) Date of Patent: Nov. 1, 2016

(54) LOOP FREE ALTERNATE SELECTION FOR MULTI-HOMED NETWORKS

(71) Applicant: Juniper Networks, Inc., Sunnyvale, CA (US)

(72) Inventors: Pushpasis Sarkar, Bangalore (IN); Harish Raghuveer, Bangalore (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 304 days.

(21) Appl. No.: 14/172,804

(22) Filed: Feb. 4, 2014

(65) Prior Publication Data
US 2015/0222545 A1 Aug. 6, 2015

(51) Int. Cl.
*H04L 12/733* (2013.01)
*H04L 12/803* (2013.01)
*H04L 12/24* (2006.01)
*H04W 88/06* (2009.01)

(52) U.S. Cl.
CPC ......... *H04L 47/122* (2013.01); *H04L 41/0663* (2013.01); *H04L 45/122* (2013.01); *H04W 88/06* (2013.01)

(58) Field of Classification Search
CPC . H04L 41/0663; H04L 45/122; H04L 45/28; H04L 47/122; H04W 88/06
USPC ........................................ 370/229, 236, 238
See application file for complete search history.

(56) References Cited

U.S. PATENT DOCUMENTS

| 2008/0225697 | A1* | 9/2008 | Bryant | H04L 45/02 370/217 |
| 2012/0051212 | A1* | 3/2012 | Xu | H04L 41/0659 370/223 |

OTHER PUBLICATIONS

Moy, "OSPF Version 2," Network Working Group, RFC 2328, Apr. 1998, 204 pp.
Atlas, "Basic Specification for IP Fast Reroute: Loop-Free Alternates," Network Working Group, RFC 5286, Sep. 2008, 32 pp.
Callon, "Use of OSI IS-IS for Routing in TCP/IP and Dual Environments," Network Working Group, RFC 1195, Dec. 1990, 80 pp.
Extended Search Report from counterpart European Application No. 15153676.0, dated Jun. 2, 2015, 8 pp.
Response to Examination Report filed Jan. 26, 2016, from counterpart European Application No. 15153676.0, 38 pp.

(Continued)

*Primary Examiner* — Mang Yeung
*Assistant Examiner* — Natali N Pascual Peguero
(74) *Attorney, Agent, or Firm* — Shumaker & Sieffert, P.A.

(57) ABSTRACT

In one example, a network device determines a set of candidate loop-free alternate (LFA) next hops for forwarding network traffic from the network device to a multi-homed network by taking into account a first cost associated with a second path from a first border router to the multi-homed network and a second cost associated with a second border router to the multi-homed network, wherein the multi-homed network is external to an interior routing domain in which the network device is located. The network device selects an LFA next hop from the set of candidate LFA next hops, to be stored as an alternate next hop for forwarding network traffic to the multi-homed network, and updates forwarding information stored by the network device to install the selected LFA next hop as the alternate next hop for forwarding network traffic from the network device to the multi-horned network.

22 Claims, 4 Drawing Sheets

(56) References Cited

OTHER PUBLICATIONS

Filsfils et al., "Loop-Free Alternate (LFA) Applicability in Service Provider (SP) Networks," RFC 6571, Internet Engineering Task Force, IETF Trust, Jun. 11, 2012, 35 pp.

Sarkar et al., "LFA selection for Multi-homed Prefixes," Routing Area Working Group Internet-Draft, draft-psarkar-rtgwg-multihomed-prefix-lfa00.txt, Internet Society, IETF, Oct. 27, 2014, 9 pp.

* cited by examiner

LOOP FREE ALTERNATE SELECTION FOR MULTI-HOMED NETWORKS

TECHNICAL FIELD

The disclosure relates to computer networks and, more particularly, to forwarding network traffic within computer networks.

BACKGROUND

A routing protocol defines a process by which network devices, referred to as routers in packet-switched networks, communicate with each other to disseminate information that allows the routers to select routes between any two nodes on a computer network. One type of routing protocol, referred to as a link state protocol, allows routers to exchange and accumulate link state information, i.e., information describing the various links within the network. With a typical link state routing protocol, the routers exchange information related to available interfaces, metrics and other variables associated with network links. This allows a router to construct its own topology or map of the network. Some examples of link state protocols include the Open Shortest Path First (OSPF) protocol and the Intermediate-System to Intermediate System (IS-IS) protocol.

The connection between two devices on a network is generally referred to as a link. Connections between devices of different autonomous systems are referred to as external links while connections between devices within the same autonomous system are referred to as internal links. Many conventional computer networks, including the Internet, are designed to dynamically reroute data packets in the event an individual link fails. Upon failure of a link, the routers transmit new connectivity information to neighboring devices, allowing each device to update its local routing table. Links can fail for any number of reasons, such as failure of the physical infrastructure between the devices, or failure of the devices interfacing with the link.

When a link or router in the network fails, routers using traditional link state protocols such as OSPF and IS-IS may take a long time to adapt their forwarding tables in response to the topological change resulting from node and link failures in the network. The process of adapting the forwarding tables is known as convergence. This time delay occurs because recovery from a failure requires each node to re-compute the shortest path algorithm to calculate the next hop for the affected nodes in the network. Until the next hops are re-computed, traffic being sent toward the failed links may be dropped. Current deployments take time in the order of 500 milliseconds to several seconds for detection and recovery from failures in the network. These large convergence times may adversely affect the performance of Voice-over Internet Protocol (VoIP) and multimedia applications, which are extremely sensitive to traffic loss. Service providers are demanding end-to-end failure detection and recovery times to be less than 50 milliseconds.

One approach to reduce failure recovery time is to select an alternate next-hop in addition to the best next-hop for a destination. Along with the best next-hop, the alternate next-hop is installed in the packet forwarding component. When a link failure occurs, the router uses the alternate next-hop for packet forwarding until the shortest path algorithm has re-computed the next hops for the updated network topology and installed the re-computed next hops in the packet forwarding component.

Sometimes, a network device or a sub-network (subnet) is provided connectivity to a network via two or more redundant PE routers (e.g., area border routers (ABRs) or autonomous system border routers (ASBRs)). The network device or subnet is referred to as being multi-homed to the network. One of the redundant PE routers may be the designated forwarder for forwarding traffic between the network device or subnet and the network.

SUMMARY

In general, the techniques of this disclosure provide improved convergence of routing tables, such as those implemented when using link state routing protocols such as the Open Shortest Path First (OSPF) protocol and the Intermediate-System to Intermediate System (IS-IS) protocol, after a network fault. Specifically, techniques are described for improved methods of identifying loop-free alternate (LFA) next hops to provide local protection for network traffic in Internet Protocol (IP) networks in the event of a topology change due to a failure. Pre-calculated loop-free alternate next hops can be used for forwarding network traffic until the convergence process completes. This disclosure describes procedures for selecting an LFA next hop to use for forwarding network traffic to multi-homed prefixes. In one aspect, a method includes determining, by a network device, a set of candidate loop-free alternate (LFA) next hops for forwarding network traffic from the network device to a multi-homed network by taking into account a first cost associated with a first path from a first border router to the multi-homed network and a second cost associated with a second path from a second border router to the multi-homed network, wherein the multi-homed network is external to an interior routing domain in which the network device is located. The method also includes selecting, by the network device, an LFA next hop from the set of candidate LFA next hops, as an alternate next hop for forwarding network traffic from the network device to the multi-homed network, and updating, by the network device, forwarding information of the network device to install the selected LFA next hop as the alternate next hop for forwarding network traffic from the network device to the multi-homed network.

In another aspect, a network device includes a control unit configured to execute a link-state routing protocol for exchanging link-state routing information to maintain network topology for a network, a physical interface configured to send and receive link-state routing updates in accordance with the link-state routing protocol, and a route selection module configured to, determine a set of candidate loop-free alternate (LFA) next hops for forwarding network traffic from the network device to a multi-homed network by taking into account a first cost associated with a second path from a first border router to the multi-homed network and a second cost associated with a second border router to the multi-homed network, wherein the multi-homed network is external to an interior routing domain in which the network device is located. The route selection module is configured to select an LFA next hop from the set of candidate LFA next hops, as an alternate next hop for forwarding network traffic from the network device to the mufti-homed network, and the route selection module is configured to update forwarding information of the network device to install the selected LFA next hop as the alternate next hop for forwarding network traffic from the network device to the multi-homed network.

In another aspect, a computer-readable storage medium includes instructions. The instructions cause a programmable processor of a network device to determine a set of one or more candidate loop-free alternate (LFA) next hops for forwarding network traffic from the network device to a multi-homed network by taking into account a first cost associated with a first path from a first border router to the multi-homed network and a second cost associated with a second path from a second border router to the multi-homed network, wherein the multi-homed network is external to an interior routing domain in which the network device is located, select an LFA next hop from the set of candidate LFA next hops, as an alternate next hop for forwarding network traffic from the network device to the multi-homed network, and update forwarding information of the network device to install the selected LFA next hop as the alternate next hop for forwarding network traffic from the network device to the multi-homed network.

The techniques of this disclosure may provide one or more advantages. For example, the techniques of this disclosure provide explicit inequalities that a network device using a link-state routing protocol can evaluate to find the LFA next hop to use for forwarding network traffic to multi-homed networks (prefixes). As another example, the techniques of this disclosure may impose upon the computing network device fewer memory and computational overhead requirements than other proposed approaches, such as an approach that requires a network device to instantiate as many nodes as the number of multi-homed prefixes being advertised into a current routing domain, and running shortest path first (SPF) computations for each multi-homed prefix.

The details of one or more examples are set forth in the accompanying drawings and the description below. Other features, objects, and advantages will be apparent from the description and drawings, and from the claims.

DETAILED DESCRIPTION

Figure 1:
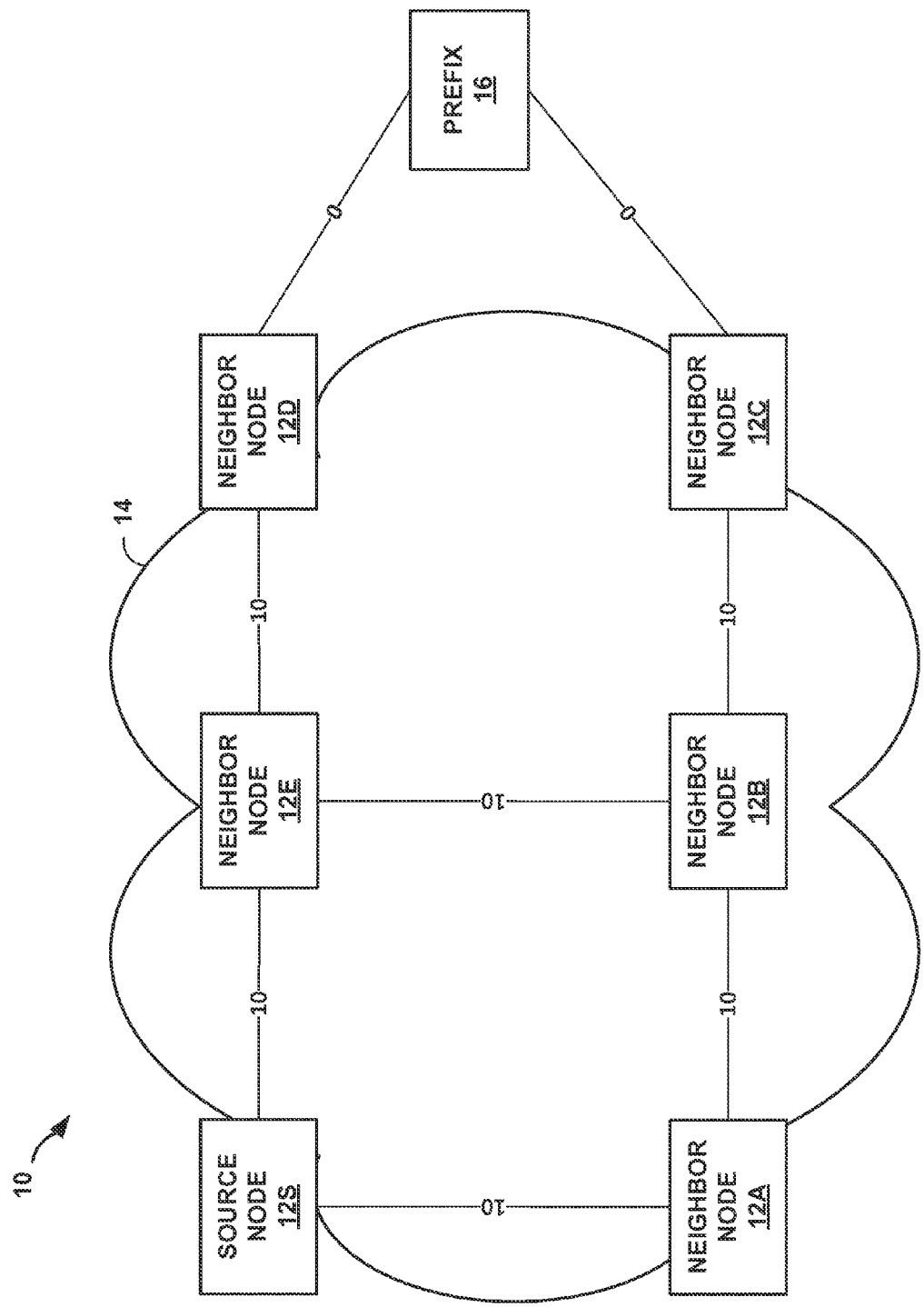
FIG. 1 is a block diagram illustrating an example network that includes network devices configured to employ the techniques described herein for selecting a loop-free alternate (LFA) next hop.

FIG. 1 is a block diagram illustrating a system 10 that includes an example network 14 having network devices 12A-12S (network devices or "nodes" 12) configured to employ the techniques described herein for selecting a loop-free alternate (LFA) next hop for use in Internet Protocol (IP) fast reroute of network traffic upon a primary next hop becoming unavailable. Network devices 12 may use the techniques described herein to accelerate convergence of routing information after a network fault.

Network devices 12 may be routers, and may use a link-state routing protocol, such as the Open Shortest Path First (OSPF) protocol or the Intermediate System to Intermediate System (IS-IS) protocol or other interior routing protocol (IGP), to exchange link-state routing information to learn the topology of network 14. That is, network devices 12 may execute an IGP routing protocol to exchange link state information for an interior routing domain associated with network 14 without exchanging information with devices outside of the interior routing domain. Although shown for simplicity and purposes of example as including network devices 12A-12G, network 14 may include additional network devices (not shown). Further details regarding OSPF are found in Moy, J., "OSPF Version 2," RFC 2328, April 1998, the entire contents of which are incorporated by reference herein. Further details regarding IS-IS are found in Callon, R, "Use of OSI IS-IS for Routing in TCP/IP and Dual Environments," RFC 1195, December 1990, the entire contents of which are incorporated by reference herein.

Each of network devices 12 may calculate next hops to be used to reach other network devices 12 in system 10 based on the link-state routing information exchanged using a link-state routing protocol, and may install the calculated next hops in stored forwarding information for forwarding network traffic destined for the other nodes. These next hops may be referred to as "primary next hops." The primary next hops are used for forwarding network traffic in the absence of any detected network failures. In accordance with the principles of this disclosure, network devices 12 may also be configured to calculate and install alternate next hops for each destination node, for use in forwarding network traffic if a failure is detected on a link or node associated with the respective primary next hop.

A subnetwork, or subnet, is a logically visible subdivision of an IP network. The practice of dividing a network into two or more networks is called subnetting. All network devices that belong to a subnet are addressed with a common, identical, most-significant bit-group in their IP addresses. This results in the logical division of an IP address into two fields, a network or routing prefix and the rest field or host identifier. The rest field is an identifier for a specific host or network interface. The routing prefix is typically expressed in Classless Inter-Domain Routing (CIDR) notation. The routing prefix may be written as the address of a network, followed by a slash character (/), and ending with the bit-length of the prefix.

Neighbor nodes 12C and 12D may be edge routers of network 14 that provide multi-homed connectivity to a network external to the network 14, such as a network represented as prefix 16. Because prefix 16 is reachable by either of neighbor nodes 12C and 12D, prefix 16 is referred to as being "multi-homed" to network 14. Multi-homing may be used in some cases to provide redundant connectivity in case one of the paths should become unavailable. In some examples, neighbor nodes 12D and 12C are provider edge (PE) routers, such as area border routers (ABRs) or autonomous system border routers (ASBRs). Prefix 16 represents one or more network devices (e.g., routers) having IP addresses that are included in a common network address prefix. Although prefix 16 is represented by a logical block, it is understood that prefix 16 represents one or more network devices that belong to a subnet and are coupled to network 14 by multiple link and one or more edge routers (not shown). In this way, the network represented by prefix 16 constitutes its own interior routing domain, and routers within prefix 16 may utilize a link-state IGP routing protocol to exchange link state information within prefix 16.

As described herein, neighbor nodes 12D and 12C may "leak" a route associated with prefix 16 into the IGP routing domain of network 14, e.g., by each sending a route advertisement messages (e.g., by a link-state routing protocol) advertising prefix 16 as being reachable via neighbor node 12D and neighbor node 12C, respectively. In general, route leaking refers to a router in a first routing domain advertising routing information network topology information) about a second routing domain to other network devices in the first routing domain. Moreover, neighbor nodes 12D and 12C may leak link-state information, including cost information associated with link providing multi-homed connectivity to prefix 16, into the IGP routing domain of network 14 even though prefix 16 and the links to prefix 16 are outside of the interior routing domain of network 14. For example, neighbor node 12D may output link-state advertisements within network 14 to advertise that prefix 16 is reachable via neighbor node 12D, and may specifying within the link-state advertisements that the cost of reaching prefix 16 from neighbor node 12D is 0. Similarly, neighbor node 12C may output link-state advertisements within network 14 to advertise that prefix 16 is reachable via neighbor node 12C, and may advertise the cost of reaching prefix 16 from neighbor node 12C is 0. As such, any IGP link-state database maintained by network devices 12 with respect to IGP routing domain 14 will include the link-state information associated with prefix 16 even though the prefix is external to the IGP routing domain. One of neighbor nodes 12D and 12C may be the designated forwarder for forwarding traffic between prefix 16 and network 14, and the other may have a backup forwarder status for forwarding traffic between prefix 16 and network 14.

From the perspective of source node 12S, a primary path for sending network traffic to prefix 16 may be selected to go through neighbor node 12E, for example. Source node 12S may select a primary next hop, such as a next hop along the shortest path to the node 12D, i.e., along the path having the lowest total cost associated with all of the links traversed. In the example of FIG. 1, source node 12S may select neighbor node 12E as the primary next hop to use for sending traffic to neighbor node 12D for reaching prefix 16 because neighbor node 12E is the next hop along the shortest path to prefix 16, i.e., along the path having the lowest total cost associated with all of the links traversed. Source node 12S may also select an alternate next hop to use for reaching prefix 16, for use in the event of a failure associated with neighbor node 12E (e.g., a failure of the link between nodes 12S and 12E, a failure of neighbor node 12E itself, or other failure). When a router detects an adjacent link failure, the router may use one or more repair paths in place of the failed link. Repair paths are pre-computed in anticipation of later failures so they can be promptly activated when a failure is detected.

Source node 12S may be configured to select an alternate next hop using the techniques described herein. This disclosure describes procedures for determining whether a given candidate LFA next hop provides link-protection or node-protection for a specific destination, where requested and available. For LFAs, an alternate next hop selected by source node 12S will be loop-free, meaning that the next hop will not send the traffic to a neighbor node on a path that goes back through source node 12S. The loop-free criterion is important because if the alternate path passed back through source node 12S, the network traffic would encounter the failure at the primary next hop and would still be dropped.

Traditional LFAs may not provide good protection for some topologies, such as multi-homed prefixes. This disclosure describes an explicit set of appropriate LFA inequality conditions for selecting LEN for multi-horned prefixes, which can be implemented by network devices such as network devices 12. By using the techniques of this disclosure, a computing network device can select a LFA next hop that provides link protection and/or node protection for multi-homed prefixes. Nodes 12 of network 14 may be configured to compute the loop-free alternate (LFA) next hops in a computationally efficient matter, as described herein. The process for computing the remote LFA next hops is described in further detail below.

As illustrated by the example topology in FIG. 1, network device 12S should check whether a router N uses network device 12S for reaching the prefix 16, through the originating router, which network device 12S also uses to forward primary traffic destined for the prefix (e.g., network device 12D). This disclosure proposes the following set of LFA inequalities for selecting the most appropriate LFAs for multi-homed prefixes (MHPs).

Link-Protection:

$$PC\_opt(N,PO\_i) < Dist\_opt(N,S) + PC\_opt(S,PO\_best) \quad (1)$$

Link-Protection+Downstream-Paths-Only:

$$PC\_opt(N,PO\_i) < PC\_opt(S,PO\_best) \quad (2)$$

Node-Protection:

$$PC\_opt(N,PO\_i) < Dist\_opt(N,E) + PC\_opt(E,PO\_best) \quad (3)$$

Where,

S is the computing router

N is the alternate router being evaluated

E is the primary nexthop on shortest path from S to prefix P.

PO_i is the specific one of the multiple prefix-originating routers being evaluated.

PO_best is the prefix-originating router on the shortest primary path from the computing network device 12S to prefix P.

PC_opt(X,Y) is the cost of reaching the prefix P from node X via originating router Y.

Dist_opt(X,Y) is the Distance on the shortest path from node X to node Y.

To compute a valid LFA for a given multi-homed prefix 16, a computing network device 12S evaluates for each alternate neighbor N, at least one of the set of LFA inequalities 1-3 found appropriate for the type of protection required, once for each remote node that originated the prefix (e.g., one for each of neighbor nodes 12C and 12D). If the inequality is satisfied by any neighbor node N for any remote prefix-originating node, network device 12S shall add neighbor node N, to the set of valid candidate LFAs for the prefix 16. Each of the LFA inequalities 1-3 uses a Prefix Cost PC_opt(X,Y), the cost of reaching the prefix from node X via the originating router Y. The prefix cost includes not only the cost of the node, but also includes the cost of originating the prefix in a network topology that is external to the routing domain of the computing router. In this manner, the computing network device, when determining the set of candidate LFA next hops, takes into account a cost from a border router to a prefix, where the prefix is associated with a different routing domain (e.g., area or autonomous system) than the computing router.

The inequalities in the above set of LFA inequalities can be applied by network device 12S in the example topology of FIG. 1 as follows. For example, network device 12S can determine whether neighbor node 12A provides link-protection for prefix 16 using Inequality 1 above as follows:

For 12D: $\underset{30}{PC\_opt(12A, 12D)} < \underset{10}{Dist\_opt(12A, 12S)} + \underset{20}{PC\_opt(12S, 12D)}$
Criteria NOT Met For 12C: $\underset{20}{PC\_opt(12A, 12C)} < \underset{10}{Dist\_opt(12A, 12S)} + \underset{20}{PC\_opt(12S, 12D)}$
Criteria Met Based on application of the LFA inequality above, network device 12A is rightly chosen as a valid link-protecting LFA.

As another example, network device 12S can determine whether neighbor node 12A provides node-protection for prefix 16 using Inequality 1 above as follows:

For 12D: $\underset{30}{PC\_opt(12A, 12D)} < \underset{20}{Dist\_opt(12A, 12E)} + \underset{10}{PC\_opt(12E, 12D)}$
Criteria NOT Met For 12C: $\underset{20}{PC\_opt(12A, 12C)} < \underset{20}{Dist\_opt(12A, 12E)} + \underset{10}{PC\_opt(12E, 12D)}$
Criteria Met Based on application of the LFA inequality above, network device 12A is rightly chosen as a valid node-protecting LFA.

Figure 2:
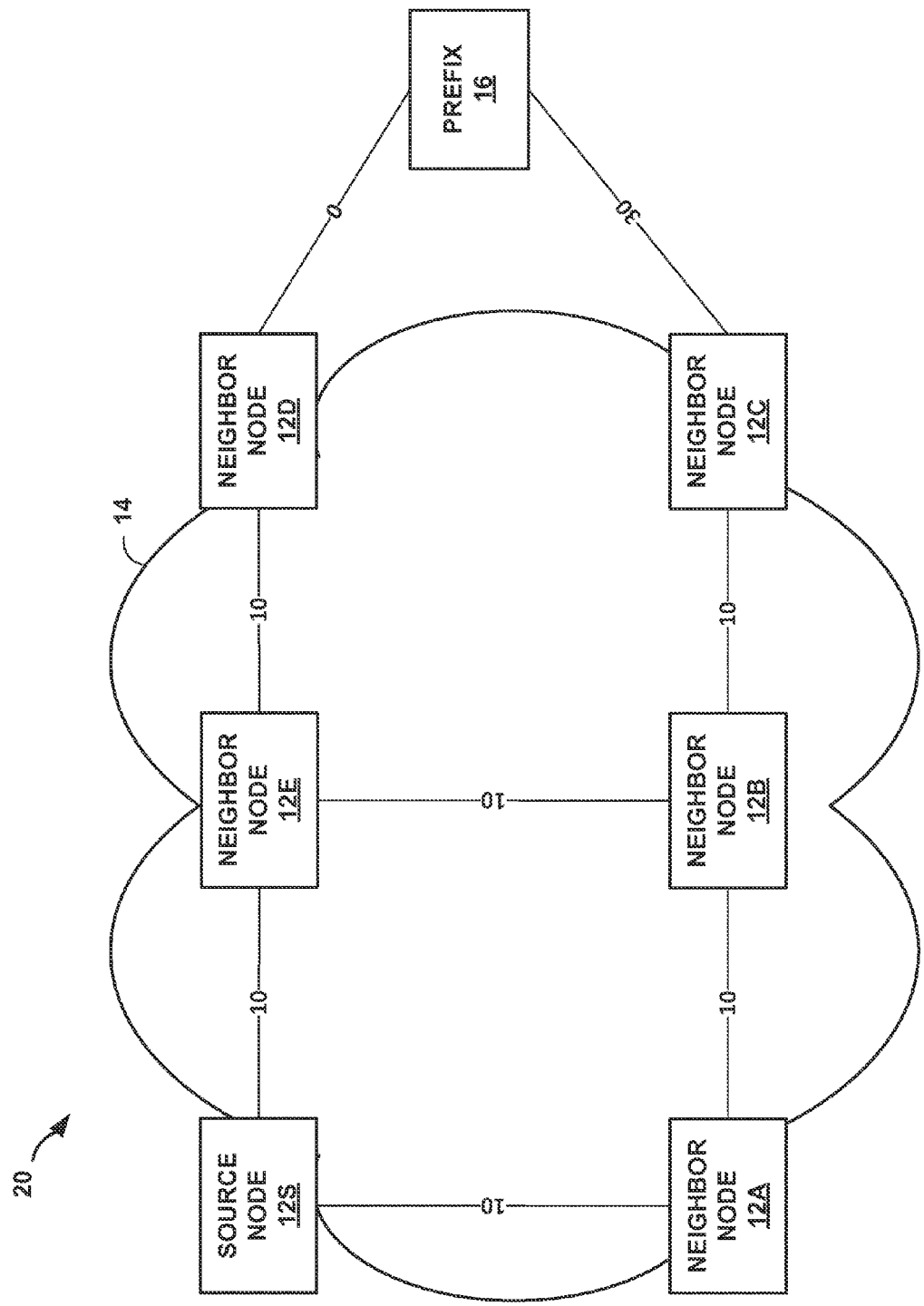
FIG. 2 is a block diagram illustrating an example network having network devices configured to employ the techniques described herein.

FIG. 2 is a block diagram illustrating an example system 20 having network devices configured to employ the techniques described herein. FIG. 2 illustrates the same system as in FIG. 1, but with different link metrics. In the example of FIG. 2, the link between neighbor node 12C and prefix P has a cost of 30, as compared to a cost of 0 for the same link in the example of FIG. 1. The same inequalities can be applied by network device 12S, in the example topology of FIG. 2, as follows:

Link-Protection:

For 12D: $\underset{30}{PC\_opt(12A, 12D)} < \underset{10}{Dist\_opt(12A, 12S)} + \underset{20}{PC\_opt(12S, 12D)}$
Criteria NOT Met For 12C: $\underset{50}{PC\_opt(12A, 12C)} < \underset{10}{Dist\_opt(12A, 12S)} + \underset{20}{PC\_opt(12S, 12D)}$
Criteria NOT Met Based on application of the LFA inequality above, router 12A is rightly NOT chosen as a valid link-protecting LFA.

Node-Protection:

For 12D: $\underset{30}{PC\_opt(12A, 12D)} < \underset{20}{Dist\_opt(12A, 12E)} + \underset{10}{PC\_opt(12E, 12D)}$
Criteria NOT Met For 12C: $\underset{50}{PC\_opt(12A, 12C)} < \underset{20}{Dist\_opt(12A, 12E)} + \underset{10}{PC\_opt(12E, 12D)}$
Criteria NOT Met Based on application of the LFA inequality above, router 12A is rightly NOT chosen as a valid node-protecting LFA.

The techniques of this disclosure provide explicit inequalities that a network device using a link-state routing protocol can evaluate to find the LFA for multi-homed prefixes. The proposed mechanism in this disclosure provides an explicit and well-illustrated set of inequalities that will provide the most appropriate LFA for such prefixes.

The techniques of this disclosure may impose upon the computing network device fewer memory and computational overhead requirements, in contrast to other approaches that may require a network device to add all prefixes to the SPF tree and instantiate as many nodes as the number of multi-homed prefixes being advertised into a current routing domain, and running SPF computations for each multi-horned prefix, for example. It can be computationally intensive to add all the prefixes to the SPF tree, and may not be feasible to implement. See A. Atlas, "Basic Specification for IP Fast Reroute: Loop-Free Alternates," Network Working Group, RFC 5286, September 2008, the entire contents of which are incorporated by reference herein.

Figure 3:
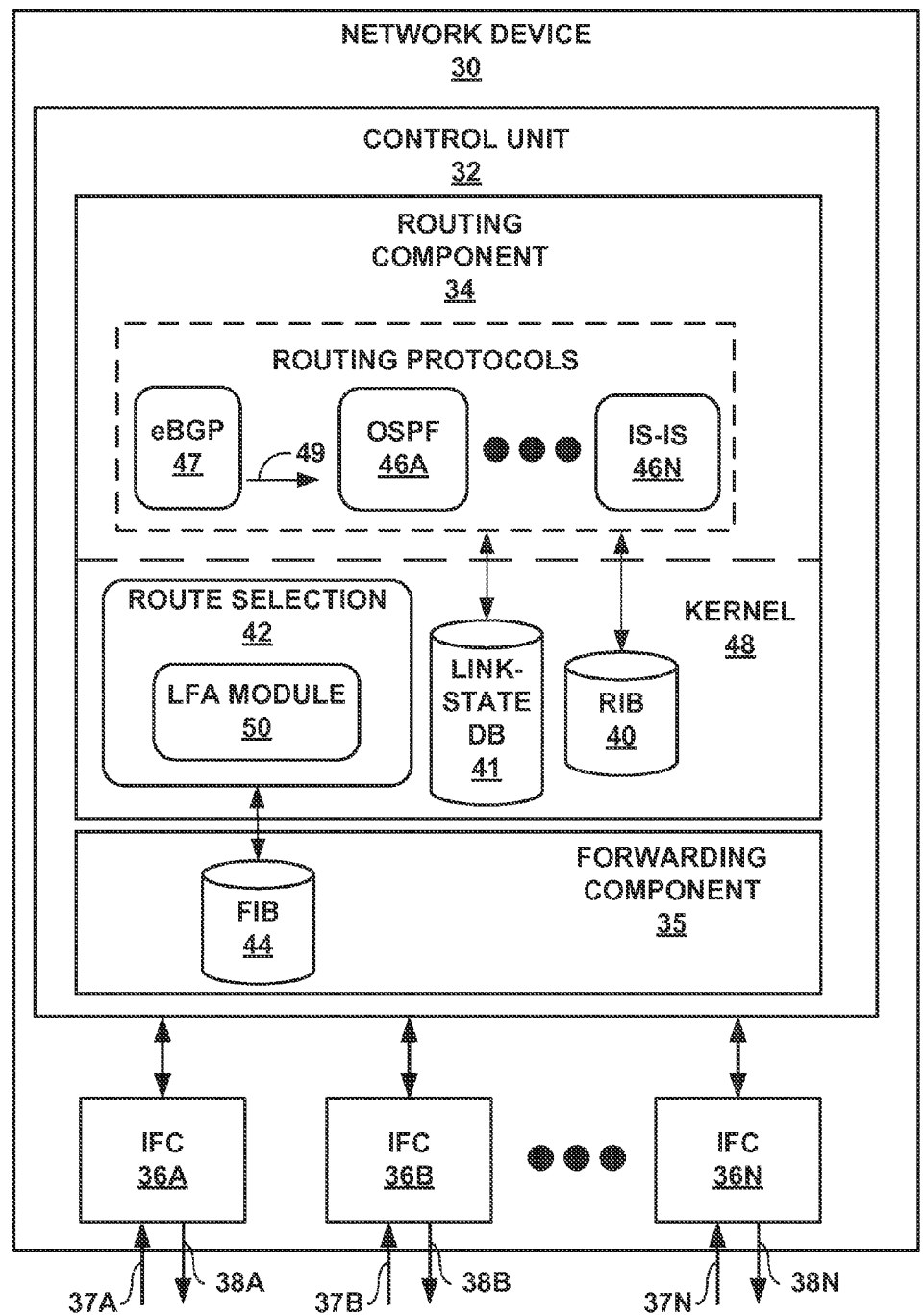
FIG. 3 is a block diagram illustrating an example router having the LFA capability described herein.

FIG. 3 is a block diagram illustrating an example network device 30 having the loop-free alternate (LFA) capability described herein. Network device 30 includes a control unit 32 that includes a routing component 34 coupled to a forwarding component 35. Network device 30 may be, for example, a router, or network device that incorporates routing functionality.

Routing component 34 provides an operating environment for routing protocols at perform routing operations to execute. Routing component 34 is responsible for the maintenance of a routing information base (RIB) 40 to reflect the current topology of a network and other network entities to which it is connected. In particular, routing component 34 periodically updates RIB 40 to accurately reflect the topology of the network and other entities. In accordance with RIB 40, forwarding component 35 maintains forwarding information base (FIB) 44 that associates network destinations with specific next hops and corresponding interface ports. For example, route selection module 42 analyzes RIB 40 and generates FIB 44 in accordance with RIB 40. Network device 30 includes interface cards 36A-36N ("IFCs 36") that receive packets via inbound links 37A-37N ("inbound links 37") and send packets via outbound links 38A-38N ("outbound links 38"). IFCs 36 are typically coupled to links 37, 38 via a number of interface ports (not shown).

Routing component 34 includes high-level, control plane routing protocols 46A-46N ("routing protocols 46"). Routing protocols 40 may be software processes executing on one or more processors. In the example of FIG. 3, routing protocols 46 include exterior Border Gateway Protocol (eBGP) 47, OSPF 46A, and IS-IS 46N. Routing component 34 may include other routing protocols not shown in FIG. 3. Routing protocols 46 interact with kernel 48 to update RIB 40 and/or link-state database (DB) 41 based on routing protocol messages received by network device 30. In response, route selection module 42 of kernel 48 generates forwarding information based on the network topology represented in RIB 40. Kernel 48 then programs forwarding component 35 to install the forwarding information as FIB 44.

In some examples, routes 49 may be learned across different instances of the same one of routing protocols 46, 47, or across different ones of the routing protocols. For example, eBGP 47 may leak, to one or both of OSPF 40A or IS-IS 46N, one or more routes 49 associated with an interior routing domain other than the interior routing domain in which network device 30 is located. As another example, a first instance of one of OSPF 40A or IS-IS 46N associated with a first interior routing domain may leak one or more routes to a second instance of OSPF 40A or IS-IS 46N associated with a second interior routing domain. The leaked routes may include a multi-homed network routing prefix. In some examples, one or more routing protocols may redistribute routes (such as for a network represented by prefix 16 of FIG. 1, for example) through a routing table (e.g., RIB 40 or link-state DB 41) into the instance participating in a current routing domain in which network device 30 is located. Routing component may either redistribute the routes as is, or may modify the routes via a configured routing policy, which may or may not modify the original metrics learned in the other routing domain. When the protocol instance participating in the current routing domain re-originates the prefixes in its link-state advertisement (LSA), the routing protocol may copy the metrics obtained through the redistribution process.

Forwarding component 35 represents hardware and logic functions that provide high-speed forwarding of network traffic. Forwarding component 35 typically includes a set of one or more forwarding chips programmed with FIB 44 that maps network destinations with specific next hops and the corresponding output interface ports. In general, when network device 30 receives a packet via one of inbound links 37, forwarding component 35 identifies an associated next hop for the data packet by traversing FIB 44 based on information within the packet. Forwarding component 35 forwards the packet on one of outbound links 38 mapped to the corresponding next hop in accordance with FIB 44.

Route selection module 42 and LFA module 50 cooperate to select and install primary next hops and loop-free alternate (LFA) next hops to FIB 44. Route selection module 42 runs a Shortest Path First (SPF) calculation on the graph G representing network 14 with respect to network device 30 as the source S to compute a primary next hop to a given destination node in graph G. This SPF calculation is denoted SPF(S, G). Route selection module 42 may obtain information that makes up graph G front RIB 40, for example.

Calculating SPF(S, G) allows route selection module 42 to obtain the optimal distance from source node 12S to all nodes 12 in the network 14 represented by graph G. This optimal distance is denoted by Distance_opt(S, D), and may also be used as part of the computation of the LFA next hop. Route selection module 12 selects the next hop having the optimal (e.g., lowest cost) distance as the primary next hop, and installs the selected primary next hop to FIB 44. Route selection module 42 also installs the selected LFA next hop into FIB 44 of forwarding component 35.

LFA module 50 uses the set of LFA inequalities described above for computing the candidate LFA next hops. In some examples, LFA module 50 can evaluate one or more of the inequalities for each prefix-originating router for each potential alternate router, for each prefix. The computing router can, when determining a set of candidate LFA next hops that provide link protection or node protection, taken into consideration a cost from a border router to the prefix, where the prefix is multi-homed to the network in which the computing router lies, and where the prefix is in a different autonomous system or area than the computing router.

In some examples, according to the Inequality 1 above for determining candidate LFA next hops that provide link protection, LFA module 50 determines whether a cost of reaching a prefix P from the alternate router N being evaluated via the specific prefix-originating router being evaluated is less than the sum of the distance on the shortest path from the alternate router N to the computing router and a cost of reaching the prefix P from the computing router via the prefix-originating router on the shortest primary path from the computing router to prefix P. If LFA module 50 determines that Inequality 1 is satisfied for the alternate router N being evaluated, LFA module 50 may select the alternate router N as the LFA next hop, or LFA module 50 may add the alternate router N to a set of candidate LFA next hops that provide link protection. If not, LFA module 50 does not select the alternate router N as an LFA next hop, and does not add the candidate router to the set of candidate LFA next hops.

In some examples, according to the Inequality 2 above for determining candidate LFA next hops that provide link protection and for downstream paths only, LFA module 50 determines whether a cost of reaching a prefix P from the alternate router N being evaluated via the specific prefix-originating router being evaluated is less than a cost of reaching the prefix P from the computing router via the prefix-originating router on the shortest primary path from the computing router to prefix P. If LFA module 50 determines that Inequality 2 is satisfied for the alternate router N being evaluated, LFA module 50 may select the alternate router N as the LFA next hop, or LFA module 50 may add the alternate router N to a set of candidate LFA next hops that provide link protection. If not, LFA module 50 does not select the alternate router N as an LFA next hop, and does not add the candidate router to the set of candidate LFA next hops.

In some examples, according to the Inequality 3 above for determining candidate LFA next hops that provide node protection, LFA module 50 determines whether a cost of reaching a prefix P from the alternate router N being evaluated via the specific prefix-originating router being evaluated is less than the sum of the distance on the shortest path from the alternate router being evaluated to the primary next hop on a shortest path from the computing router to prefix P and the cost of reaching prefix P from the primary next hop on the shortest path from the computing router to prefix P via the prefix-originating router on the shortest primary path from the computing router to the prefix P. If LFA module 50 determines that Inequality 3 is satisfied for the alternate router N being evaluated, LFA module 50 may select the alternate router N as the LFA next hop, or LFA module 50 may add the alternate router N to a set of candidate LFA next hops that provide node protection. If not, LFA module 50 does not select the alternate router N as an LFA next hop, and does not add the candidate router to the set of candidate LFA next hops.

In some examples, LFA module 50 can select a single LFA next hop from among multiple candidate next hops in a set of candidate LFA next hops based on any of a variety of selection policies that may be configured on network device 30.

The architecture of network device 30 illustrated in FIG. 3 is shown for purposes of example. The disclosure is not limited to this architecture. In other embodiments, network device 30 may be configured in a variety of ways. In one embodiment, for example, some of the functionally of routing component 34 and forwarding component 35 may be distributed within IFCs 36.

Control unit 32 may be implemented solely in software, or hardware, or may be implemented as combinations of software, hardware, or firmware. For example, control unit 32 may include one or more processors which execute software instructions. In that case, the various software modules of control unit 32 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media.

Figure 4:
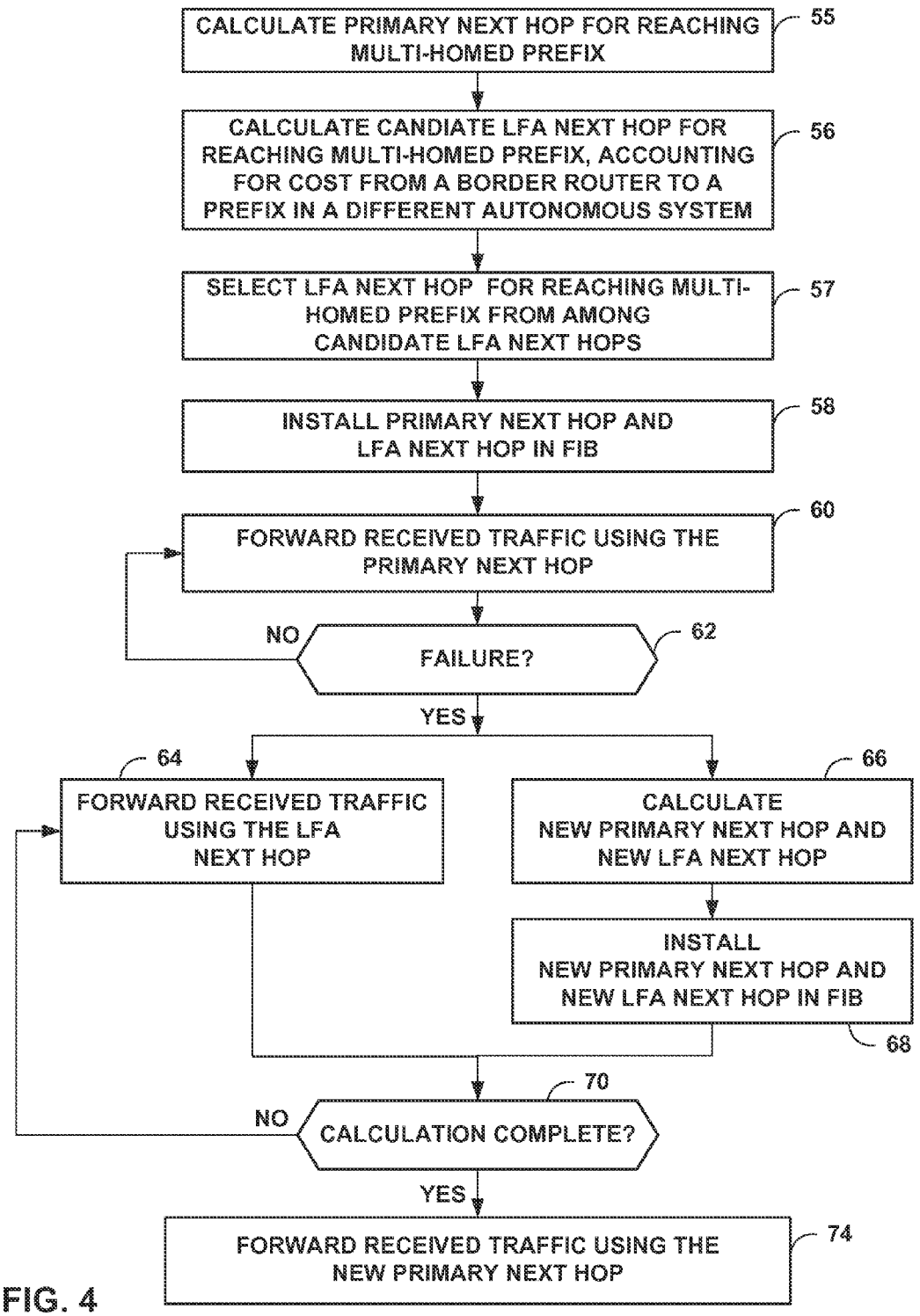
FIG. 4 is a flowchart illustrating an example mode of operation of one or more network devices in a network in using the techniques described herein.

FIG. 4 is a flowchart illustrating an example mode of operation of one or more network devices in a network in using the techniques described herein. The network device may be a router such as source node 12S of FIGS. 1 and 2, or network device 30 of FIG. 3, and FIG. 4 is described for purposes of example by reference to these example devices. Each of network devices 12 may calculate primary next hops to be used to reach multi-homed prefix 16 based on the link-state routing information in its respective RIB 40 (55). For example, LFA module 50 of source node 12S may select neighbor node 12E as the primary next hop for reaching prefix 16.

LFA module 50 of source node 12S may also determine one or more candidate loop-free alternate (LFA) next hops to use for reaching multi-homed prefix 16 that lies in a different AS or area than source node 12S (56), in accordance with the techniques of this disclosure, in a manner that considers a cost from a border router to the multi-homed prefix 16. For example, LFA module 50 may determine one or more candidate next hops that provide link protection and/or node protection using one or more of the set of LFA inequalities given above. LFA module 50 selects an LFA next hop (e.g., from among a set of one or more candidate LFA next hops) to use for reaching multi-homed prefix 16 (57), such as for use in the event of a failure associated with neighbor node 12E. For example, LFA module 50 may, in some examples, select neighbor node 12A as an LFA next hop that provides link and node protection for reaching multi-homed prefix 16. LFA module 50 installs the selected LFA next hop in FIB 44 for forwarding network traffic destined for prefix 16 (58).

In some examples, where link-protection is required on the primary next hop link, LFA module 50 calculates and selects the LFA next hop so as to provide link-protection if possible, in accordance with the techniques of this disclosure. In some examples, where node-protection is required on the primary next hop link, LFA module 50 calculates and selects the next hop so as to provide link-protection and/or node-protection if possible, in accordance with the techniques of this disclosure. LFA module 50 may select an LFA next hop that provides both link and node protection. In this manner, the computing network device, when determining the set of candidate LFA next hops, takes into account a cost from a border router to a prefix, where the prefix is associated with a different area or autonomous system than the computing router.

After the primly and alternate next hops are installed in forwarding information of source node 12S, and upon receiving packets destined for prefix 16, source node 12S will forward the packets on the link to the primary next hop neighbor node 12E, in accordance with FIB 44 (60). Upon detecting that a failure condition has occurred for the primary next hop (62), source node 12S begins forwarding the received packets destined for destination node 12F using the LFA next hop associated with prefix 16, e.g., using neighbor node 12C (64). Also upon detecting the failure condition, source node 12S also begins calculating a new primary next hop and a new alternate next hop based on the changed network topology (66). After the new primary next hop and alternate next hop are calculated, source node 12S installs the primary next hop and alternate next hop in FIB 44 (68). After the calculation of the primary and LFA next hops are completed (70), source node 12S begins forwarding subsequently received packets using the new primary next hop (74).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or, other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

The invention claimed is:

1. A method comprising:
   determining, by a network device, a set of one or more candidate loop-free alternate (LFA) next hops that provide node protection for forwarding network traffic from the network device to a multi-homed network, wherein determining the set of candidate LFA next hops that provide node protection comprises determining whether a cost of reaching the multi-homed network from an alternate router being evaluated via a prefix-originating router being evaluated is less than a sum of a distance on a shortest path from the alternate router being evaluated to a primary next hop on a shortest path from the network device to the multi-homed network and a cost of reaching multi-homed network from the primary next hop on a shortest path from the network device to the multi-homed network via the prefix-originating router on a shortest primary path from the network device to the multi-homed network, wherein the multi-homed network is external to an interior routing domain in which the network device is located;

selecting, by the network device, an LFA next hop from the set of candidate LFA next hops that provide node protection, as an alternate next hop for forwarding network traffic from the network device to the multi-homed network; and updating, by the network device, forwarding information of the network device to install the selected LFA next hop as the alternate next hop for forwarding network traffic from the network device to the multi-homed network.

2. The method of claim 1, further comprising:
determining a set of candidate LFA next hops that provide link protection, wherein determining the set of candidate LFA next hops that provide link protection comprises determining whether a cost of reaching the multi-homed network from an alternate router being evaluated via a prefix-originating router being evaluated is less than a sum of a distance on a shortest path from the alternate router to the network device and a cost of reaching the multi-homed network from the network device via the prefix-originating router on a shortest primary path from the network device to multi-homed network.

3. The method of claim 2, further comprising:
in response to determining that the cost of reaching the multi-homed network from the alternate router being evaluated via the prefix-originating router being evaluated is less than the sum of the distance on the shortest path from the alternate router to the network device and the cost of reaching the multi-homed network from the network device via the prefix-originating router on the shortest primary path from the network device to multi-homed network, adding the alternate router to the set of candidate LFA next hops that provide link protection.

4. The method of claim 1, further comprising:
determining a set of candidate LFA next hops that provide link protection and satisfy a downstream condition, wherein determining the set of candidate LFA next hops that provide link protection and satisfy a downstream condition comprises determining whether a cost of reaching the multi-homed network from an alternate router being evaluated via a prefix-originating router being evaluated is less than a cost of reaching the multi-homed network from the network device via the prefix-originating router on a shortest primary path from the network device to multi-homed network.

5. The method of claim 4, further comprising:
in response to determining that the cost of reaching the multi-homed network from the alternate router being evaluated via the prefix-originating router being evaluated is less than the cost of reaching the multi-homed network from the network device via the prefix-originating router on the shortest primary path from the network device to multi-homed network, adding the alternate router to the set of candidate LFA next hops that provide link protection and satisfy a downstream condition.

6. The method of claim 1, further comprising:
in response to determining that the cost of reaching the multi-homed network from the alternate router being evaluated via the prefix-originating router being evaluated is less than the sum of the distance on the shortest path from the alternate router being evaluated to the primary next hop on the shortest path from the network device to the multi-homed network and the cost of reaching multi-homed network from the primary next hop on the shortest path from the network device to the multi-homed network via the prefix-originating router on the shortest primary path from the network device to the multi-homed network, adding the alternate router to the set of candidate LFA next hops that provide node protection.

7. The method of claim 1, further comprising, by the network device, selecting a primary next hop to use in forwarding network traffic from the network device to the multi-homed network based on link-state routing information exchanged using a link-state routing protocol.

8. The method of claim 7, further comprising:
receiving network traffic destined for the multi-homed network; and
when the primary next hop is operational, forwarding the network traffic to the multi-homed network using the primary next hop; and
when the primary next hop is not operational, forwarding the network traffic to the multi-homed network using the selected LFA next hop.

9. The method of claim 7, further comprising installing the primary next hop in forwarding information of the network device for forwarding network traffic from the network device to the multi-homed network.

10. The method of claim 1, further comprising receiving, by the network device, a routing advertisement from the prefix-originating router, wherein the routing advertisement specifies a routing prefix for the multi-homed network and a cost associated with a path from the prefix-originating router to the multi-homed network.

11. The method of claim 1, wherein the selected LFA next hop provides node protection to a primary next hop node on the shortest path from the network device to the multi-homed network.

12. The method of claim 1, wherein the selected LFA next hop provides link protection on the shortest path from the network device to the multi-homed network.

13. A network device comprising:
a control unit comprising circuitry and configured to execute a link-state routing protocol for exchanging link-state routing information to maintain network topology for an interior routing domain within which the network device is positioned;
a physical interface configured to send and receive link-state routing updates in accordance with the link-state routing protocol; and
a route selection module comprising circuitry and configured to determine a set of one or more candidate loop-free alternate (LFA) next hops that provide node protection for forwarding network traffic from the network device to a multi-homed network by determining whether a cost of reaching the multi-homed network from an alternate router being evaluated via a prefix-originating router being evaluated is less than a sum of a distance on a shortest path from the alternate router being evaluated to a primary next hop on a shortest path from the network device to the multi-homed network and a cost of reaching multi-homed network from the primary next hop on a shortest path from the network device to the multi-homed network via the prefix-originating router on a shortest primary path from the network device to the multi-homed network, wherein the multi-homed network is external to an interior routing domain in which the network device is located, wherein the route selection module is configured to select an LFA next hop from the set of candidate LFA next hops that provide node protection and install the selected LFA next hop within forwarding information of the network device as an alternate next hop for forwarding network traffic from the network device to the multi-homed network.

14. The network device of claim 13, wherein the route selection module is configured to determine whether a cost of reaching the multi-homed network from an alternate router being evaluated via a prefix-originating router being evaluated is less than a sum of a distance on a shortest path from the alternate router to the network device and a cost of reaching the multi-homed network from the network device via the prefix-originating router on a shortest primary path from the network device to multi-homed network.

15. The network device of claim 14, wherein the route selection module is configured to, in response to determining that the cost of reaching the multi-homed network from the alternate router being evaluated via the prefix-originating router being evaluated is less than the sum of the distance on the shortest path from the alternate router to the network device and the cost of reaching the multi-homed network from the network device via the prefix-originating router on the shortest primary path from the network device to multi-homed network, add the alternate router to a set of candidate LFA next hops that provide link protection.

16. The network device of claim 13, wherein the route selection module is configured to determine whether a cost of reaching the multi-homed network from an alternate router being evaluated via a prefix-originating router being evaluated is less than a cost of reaching the multi-homed network from the network device via the prefix-originating router on a shortest primary path from the network device to multi-homed network.

17. The network device of claim 16, wherein the route selection module is configured to, in response to determining that the cost of reaching the multi-homed network from the alternate router being evaluated via the prefix-originating router being evaluated is less than the cost of reaching the multi-homed network from the network device via the prefix-originating router on the shortest primary path from the network device to multi-homed network, add the alternate router to a set of candidate LFA next hops that provide link protection and satisfy a downstream condition.

18. The network device of claim 13, wherein the route selection module is configured to, in response to determining that the cost of reaching the multi-homed network from the alternate router being evaluated via the prefix-originating router being evaluated is less than the sum of the distance on the shortest path from the alternate router being evaluated to the primary next hop on the shortest path from the network device to the multi-homed network and the cost of reaching multi-homed network from the primary next hop on the shortest path from the network device to the multi-homed network via the prefix-originating router on the shortest primary path from the network device to the multi-homed network, add the alternate router to the set of candidate LFA next hops that provide node protection.

19. The network device of claim 13, wherein the route selection module is configured to select a primary next hop to use in forwarding network traffic from the network device to the multi-homed network based on link-state routing information exchanged using a link-state routing protocol.

20. The network device of claim 19, further comprising:
a forwarding component to receive network traffic destined for a destination associated with the multi-homed network,
wherein when the primary next hop is operational, the forwarding component forwards the network traffic to the routing prefix using the primary next hop, and
wherein when the primary next hop is not operational, the forwarding component forwards the network traffic to the multi-homed network using the LFA next hop.

21. The network device of claim 19, wherein the route selection module is configured to install the primary next hop in forwarding information of the network device for forwarding network traffic from the network device to the multi-homed network.

22. A non-transitory computer-readable storage medium comprising instructions for causing a programmable processor of a network device to:
determine a set of one or more candidate loop-free alternate (LFA) next hops that provide node protection for forwarding network traffic from the network device to a multi-homed network by determining whether a cost of reaching the multi-homed network from an alternate router being evaluated via a prefix-originating router being evaluated is less than a sum of a distance on a shortest path from the alternate router being evaluated to a primary next hop on a shortest path from the network device to the multi-homed network and a cost of reaching multi-homed network from the primary next hop on a shortest path from the network device to the multi-homed network via the prefix-originating router on a shortest primary path from the network device to the multi-homed network, wherein the multi-homed network is external to an interior routing domain in which the network device is located;
select an LFA next hop from the set of candidate LFA next hops that provide node protection, as an alternate next hop for forwarding network traffic from the network device to the multi-homed network; and
update forwarding information of the network device to install the selected LFA next hop as the alternate next hop for forwarding network traffic from the network device to the multi-homed network.

\* \* \* \* \*